United States Patent [19]

Ohkura et al.

[11] 4,417,798
[45] Nov. 29, 1983

[54] DATA TRANSMITTING ELECTRICAL CONTACT MEANS SWITCHING DEVICE IN CAMERA

[75] Inventors: Zenichi Ohkura, Ichikawa; Yasuyuki Haneishi, Tokyo, both of Japan

[73] Assignee: Asahi Kogaku Kogyo Kabushiki Kaisha, Tokyo, Japan

[21] Appl. No.: 269,098

[22] Filed: Jun. 2, 1981

[30] Foreign Application Priority Data

Jun. 6, 1980 [JP] Japan .......................... 55-79057[U]

[51] Int. Cl.³ .......................... G03B 9/02; G03B 17/00
[52] U.S. Cl. .................................... 354/271; 354/286
[58] Field of Search ............... 350/252, 257; 352/142, 352/231; 354/270–274, 286,196, 197, 195, 295, 43, 44, 46, 47, 289

[56] References Cited

U.S. PATENT DOCUMENTS

| | | | |
|---|---|---|---|
| 3,762,295 | 10/1973 | Kitai | 354/286 X |
| 3,928,858 | 12/1975 | Sakurada et al. | 354/289 X |
| 3,956,762 | 5/1976 | Miyamoto | 354/289 |
| 4,104,649 | 8/1978 | Tanaka et al. | 354/286 X |
| 4,118,713 | 10/1978 | Murakami et al. | 354/286 X |

*Primary Examiner*—Donald A. Griffin
*Attorney, Agent, or Firm*—Sughrue, Mion, Zinn, Macpeak & Seas

[57] ABSTRACT

A data transmitting electrical contact switching device for a camera adapted for operation in both a shutter speed priority automatic exposure mode and an aperture priority automatic exposure mode. First and second switching electrical contacts are provided on a lens mount and a body mount, respectively, at positions opposite one another. The first switching electrical contact is urged elastically to protrude from a surface of a lens mount while the second switching electrical contact is recessed from the surface of the body mount. A switching plate supports the first switching electrical contact with a pin located at an end portion of the switching plate. The pin is positioned in an elongated groove formed in an aperture preset ring so as to prevent protrusion of the first switching electrical contact in other than the automatic aperture control mode. In the automatic aperture control mode, the pin drops into a notch which extends from the elongated groove to permit the first switching electrical contact to come into contact with the second switching electrical contact.

4 Claims, 8 Drawing Figures

DATA TRANSMITTING ELECTRICAL CONTACT MEANS SWITCHING DEVICE IN CAMERA

BACKGROUND OF THE INVENTION

The invention relates to a device for switching electrical contacts adapted to electrically transmit automatic aperture control and manual aperture control switching data from a photographing lens in an interchangeable lens type camera to the camera body side.

Two techniques for carrying out automatic exposure control in a camera are a "shutter speed priority automatic exposure" system (or EE system) in which the shutter speed is determined manually by the photographer and the aperture is automatically adjusted in accordance with the shutter speed thus determined, and an "aperture priority automatic exposure" (ES system) in which first the aperture value is manually determined by the photographer and the shutter speed is automatically adjusted in accordance with the aperture value thus determined.

A photographing lens which can be used with both of the two above-described systems has an automatic aperture mechanism for allowing the camera body to automatically control the lens opening in the EE mode and a manual aperture mechanism which allows the photographer to manually determine the lens opening in the ES mode.

Heretofore, the automatic and manual exposure control switching signal of a photographing lens has most often been mechanically transmitted. However, mechanically transmitting the switching signal with high accuracy as described above is disadvantageous in that the required mechanism is intricate and large in size which makes the lens expensive.

Furthermore, a technique has been proposed in the art in which data as to a present aperture opening and the minimum aperture value of a photographing lens and the aforementioned automatic and manual aperture control switching signal are transmitted as electrical signals from the lens side to the camera body side. To do this, a change-over switch for producing the automatic and manual aperture control switching signal in the lens barrel is provided and the signal produced thereby is applied to an electrical contact on the lens mount through a lead wire. However, in this case it is necessary to provide a space for the lead wire in the lens barrel. Therefore, such a change-over switch cannot be provided in a small and light photographing lens.

SUMMARY OF THE INVENTION

In view of the foregoing, an object of the invention is to provide a data transmitting electrical contact switching device of simple construction which can be provided in a small space and which can transmit the automatic and manual aperture control switching signal without using lead wires.

In accordance with this and other objects of the invention, there is provided a data transmitting electrical contact switching device for a camera including first and second switching electrical contacts provided, respectively, on a lens mount and a body mount at positions such that the first and second switching electrical contacts are opposite one another when the lens mount is operatively coupled to the body mount. A coil spring urges the first switching electrical contact on the lens mount side so as to protrude from a surface of the lens mount. The second switching electrical contact on the body mount side is recessed from a surface of the body mount with the second switching electrical contact being electrically insulated from the body mount. An L-shaped switching plate supports the first switching electrical contact with a first leg thereof fitted into a guide groove formed in a lens barrel around which an aperture preset ring is rotatably mounted. The aperture preset ring has an elongated groove formed therein with a notch extending forwardly from the elongated groove. The notch is so positioned that a pin provided at an end portion of the switching plate abuts only against a side wall of the elongated groove to prevent protrusion of the first switching electrical contact when the aperture preset ring is at a manual aperture control mode position while the pin drops into the notch when the aperture preset ring is rotated to an automatic aperture control mode position in which case the first switching electrical contact protrudes from the lens mount surface and comes into contact with the second switching electrical contact on the body mount side.

DESCRIPTION OF THE PREFERRED EMBODIMENTS

The invention will be described with reference to a preferred embodiment shown in the accompanying drawings.

Figure 1A:
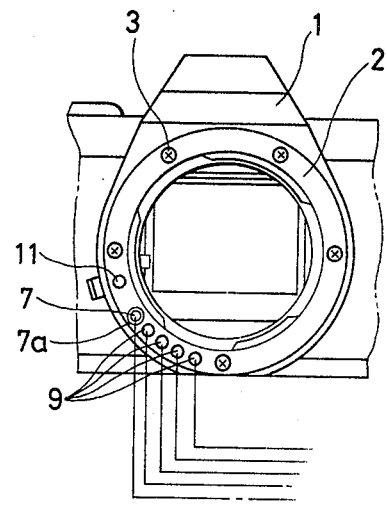
FIG. 1A is a front view of a part of a camera body.
Figure 1B:
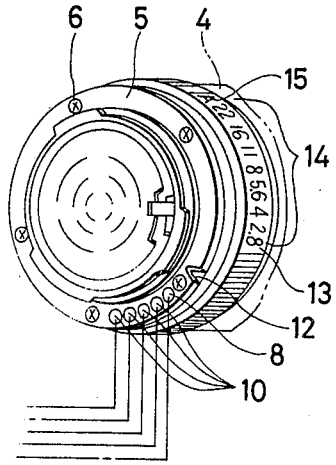
FIG. 1B is a perspective view showing a part of a photographing lens which is to be mounted on the camera body in FIG. 1A.

As shown in FIGS. 1A and 1B, a body mount 2 made of electrically conductive material is integrally coupled to a camera body 1 with screws 3. Similarly, a lens mount 5 made of electrically conductive material is coupled to a lens barrel 4 with screws 6. The mounts 2 and 5 have electrical contacts which are located so as to connect to one another. More specifically, the mounts 2 and 5 have switching electrical contacts 7 and 8 which are paired to transmit from the lens side to the camera body side data which is required for the automatic aperture control and electrical contacts 9 and 10 which are paired to transmit to the camera body side data related to inherent aperture values (aperture opening values and minimum aperture values) which differ according to the lens employed. The data may be made in the form of currents or other electrical quantities which are determined by resistances or the like.

The lens barrel 4 is mounted on the camera body 1 by a conventional bayonet coupling. Immediately before the lens barrel 4 is coupled to the camera body 1, a lock pin 11 elastically protruding from the body mount 2 is inserted into a lock groove 12 formed in the lens mount 5 to lock the lens barrel 4 in such a manner that the above-described pairs of electrical contacts are connected to one another.

An aperture preset ring 13 is provided rotatably around the outer wall of the lens barrel 4 integral with the lens mount 5. Manual aperture markings 14 indicating that the photographing lens is in a manual operation mode and an automatic aperture marking 15 indicating that the photographing lens is in an automatic operation mode are marked on the outer wall of the aperture preset ring 13.

The switching electrical contacts 7 and 8 will be described in more detail. The electrical contact 7 is electrically insulated from the body mount 2 by a collar 7a. One end face of the contact 7 is in contact with a substrate 16 connected to a circuit (not shown) while the other end face is recessed from the mount surface 2a of the body mount 2.

Figure 2:
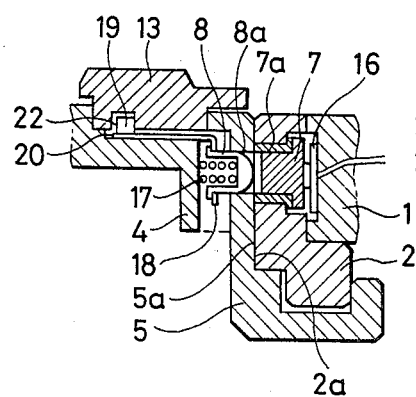
FIG. 2 is a sectional side view showing essential parts of an automatic manual switching electrical contact device of the invention in a manual aperture control mode.
Figure 6:
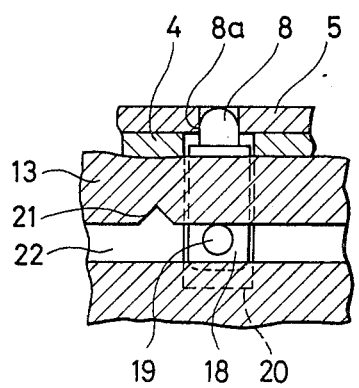
FIG. 6 is a sectional view showing essential parts of the automatic manual switching electrical contact structure of FIG. 4 in the manual aperture contol mode.

The switching electrical contact 8 to be coupled to the switching electrical contact 7 is provided on the lens side. More specifically, the contact 8 is slidably fitted in a hole 8a formed in the mount surface 5a of the lens mount 5. One end portion of the contact 8 is supported by one end portion of the vertical part of a switching plate 18 which is L-shaped in section. The switching plate 18 is slidably provided in a guide groove 20 formed in the outer wall of the lens barrel 4. A compression spring 17 is inserted between the electrical contact 8 and the lens barrel 4 to maintain the electrical contact 8 elastically protruding from the mount surface of the lens mount 5. A pin 19 is provided on one end portion of the sliding part (horizontal part) of the switching plate 18. When a manual aperture marking 14 on the outer wall of the aperture preset ring 13 is aligned with the aperture index (not shown), the pin 19 is abutted against the side wall of an elongated groove 22 which is formed in the inner wall of the aperture preset ring 13 entirely within the guide groove 20, as shown in FIG. 2 or 6, so that the switching electrical contact 8 is prevented from protruding from the mount surface 5a of the lens mount.

Figure 3:
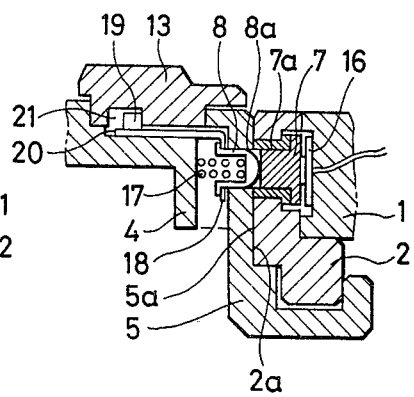
FIG. 3 is a sectional side view showing the same parts in an automatic aperture control mode.
Figure 7:
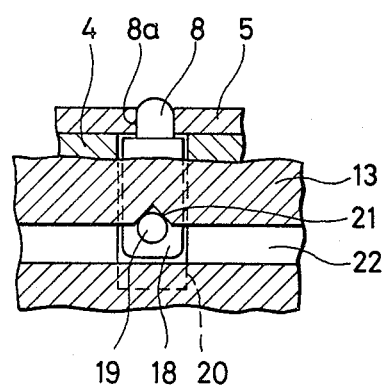
FIG. 7 is a sectional view showing the same parts in the automatic aperture control mode.

On the other hand, when the automatic aperture marking 15 on the outer wall of the aperture preset ring 15 is aligned with the aperture index, the pin 19 is dropped into a V-shaped notch 21 which is formed in the side wall of the elongated groove 22, as shown in FIG. 3 or 7, as a result of which the switching electrical contact 8 is brought into contact with the switching electrical contact 7 by being protruded from the mount surface 5a by the elastic force of the compression spring 17.

The guide groove 20 operates to guide the movement of the switching plate 18 when the manual aperture control mode is being switched over to the automatic aperture control mode and vice versa, and to prevent rotation of the switching plate 18 around the switching electrical contact 8 when the pin 19 is shifted from the groove to the elongated groove 22.

Figure 4:
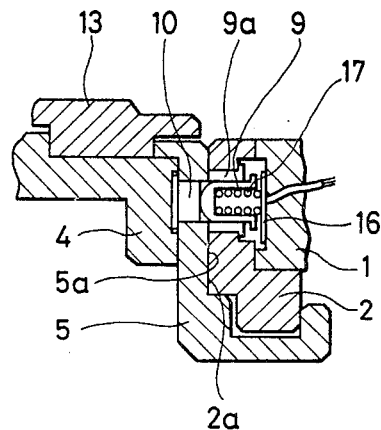
FIG. 4 is a sectional side view showing essential parts of an aperture electrical contact structure.
Figure 5:
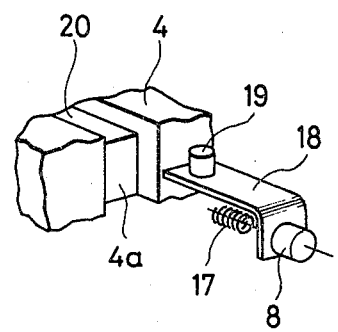
FIG. 5 is a perspective view of essential parts of the automatic manual switching electrical contact structure of FIG. 4.

FIG. 4 is a sectional side view showing an aperture value electrical contact structure in the automatic aperture control mode position. An electrical contact 9, electrically insulated from the body mount 2 by a collar 9a, is in electrical contact with a substrate 16 as it protrudes from the mount surface 2a of the body mount 2 urged by a compression spring 17a. A mating electrical contact 10 is fixedly secured to the lens mount 5. The circuit is connected when the photographing lens is mounted on the camera body to transmit data from the lens to the camera body.

The operation of the device constructed as described above will be described.

When the photographing lens has been mounted on the camera body, in the manual aperture control mode (FIG. 2 or 6), the pin 19 is engaged with the side wall of the elongated groove 22 in the aperture preset ring 13 so that the switching electrical contact 8 supported by the switching plate 18 is retracted from the mount surface 5a of the lens mount 5 against the elastic force of the compression spring 17. That is, the electrical contact 8 is disconnected from the switching electrical contact 7 and accordingly from the circuit.

In the automatic aperture control mode, the aperture preset ring 13 is turned from the manual aperture position to the automatic aperture position, whereupon the pin 19 secured to the switching plate 18 is dropped into the notch 21 by the elastic force of the compression spring 17, as a result of which the switching plate 18 is moved along the guide groove 20. That is, the switching electrical contact 8 is protruded to contact the switching electrical contact 7 on the camera body side. Thus, the electrical contact 8 is connected through the electrical contact 7 to the circuit.

If the photographing lens when set in the automatic aperture control mode is mounted on the camera body, it is mounted on the camera body while the switching electrical contact 8 is brought into contact with the body mount 2 and the electrical contacts 9. However, after the lens has been completely mounted on the body, the switching electrical contact 8 on the photographing lens side is brought into contact with the switching electrical contact 7 on the camera body side while the pairs of electrical contacts 9 and 10 are brought into contact with one another. On the other hand, if the photographing lens set in the automatic aperture control mode is removed from the camera body, the circuit is opened at the time instant when the switching electrical contact 8 on the lens side is disconnected from the switching electrical contact 7 on the camera body side.

As described above in detail, in the device according to the invention, the switching plate 18 is moved along the guide groove 20 as the aperture preset ring 13 is turned from the manual aperture position to the automatic aperture position or vice versa. In this operation, the switching plate 18 and the electrical contact 8 are smoothly moved because of the compression spring 17 for elastically protruding the electrical contact 8. The guide groove 20 not only guides the switching plate 18, but also guides the switching plate 18 and prevents deformation of the switching plate 18 when the pin 19 is shifted to the switching groove 22 as the automatic aperture control mode is switched over to the manual aperture control mode.

With this arrangement, a wide choice of the material, thickness and configuration of the switching plate is available. In addition, the use of ordinary switches and lead wires is unnecessary. Therefore, in the device for switching data transmitting electrical contacts according to the invention, the number of components required for forming the device is small, and the components are simple in configuration which facilitates the assembly of the device. Moreover, the device requires only a small space for installation.

What is claimed is:

1. A data transmitting electrical contact switching device for a camera comprising: first and second switching electrical contacts provided on a lens mount and a body mount, respectively, at positions such that said first and second switching electrical contacts are adjacent one another when said lens mount is operatively coupled to said body mount; means for urging said first switching electrical contact on said lens mount side elastically to protrude from a surface of said lens mount, said second switching electrical contact on said body mount side being recessed from a surface of said body mount opposite said first switching electrical contact; a switching plate supporting said first switching electrical contact; an aperture preset ring having an elongated groove formed therein and a notch extending from said elongated groove; a pin provided at an end portion of said switching plate, said pin abutting against a side wall of said elongated groove to prevent protrusion of said first switching electrical contact on said lens mount side for a manual aperture control mode position of said aperture preset ring and said pin being fitted into said notch in an automatic aperture control mode position of said aperture preset ring so that said first switching electrical contact on said lens mount side protrudes from said lens mount surface so as to be in contact with said second switching electrical contact on said body mount side.

2. The data transmitting electrical contact switching device of claim 1 wherein a guide groove is provided in a lens barrel, said switching plate being substantially L-shaped having a first leg thereof received in said guide groove and said first switching electrical contact being mounted on a second leg of said switching plate.

3. The data transmitting electrical contact switching device of claim 1 further comprising an insulating collar disposed around said second switching electrical contact to insulate said second switching electrical contact from said body mount.

4. The data transmitting electrical contact switching device of one of claims 1–3 wherein said elongated groove extends at least partially circumferentially perpendicular to an axis of a lens coupled to said lens mount and wherein said notch is V-shaped and extends forwardly of said elongated groove.

* * * * *